Figure 1:
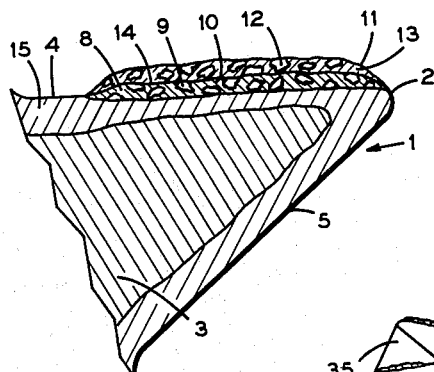

STANLEY R. SCALES
ALLEN E. WISLER
INVENTORS

BY Roy N. Smith, Jr.
ATTORNEY

3,260,579
HARDFACING STRUCTURE

Stanley R. Scales and Allen E. Wisler, Houston, Tex., assignors to Hughes Tool Company, Houston, Tex., a corporation of Delaware
Filed Feb. 14, 1962, Ser. No. 173,153
6 Claims. (Cl. 29—195)

The present invention deals with layers or coatings, fillings, etc., of hardfacing, in particular hardfacing containing coarsely ground particles of such hard materials as tungsten carbide. Such hardfacing is of special utility on tools subject to severe or constant abrasion, frequently accompanied by repeated heavy impacts. Examples are tools used in penetrating earth formations such as various parts of rock bits, core bits, reamers and tool joints. As will be discussed more fully below, specific forms of the present invention have been reduced to practice as hardfacing on the steel cutting teeth of rock bits.

Prior art hardfacings containing tungsten carbide include two general types, commonly referred to as "sweat-on" and "tube" hardfacings. To produce the sweat-on structure, an aqueous solution of sodium silicate is applied to the steel surface to be coated, tungsten carbide particles are brushed on or otherwise applied to the wet surface, and the water is allowed to evaporate. Heat is then applied to the surface through a welding torch until the steel is sufficiently softened to permit the articles to sink until about ¾ of each particle lies below the surface, after which the torch is moved on and the surface is allowed to cool.

The chief limitation of the sweat-on method lies in the fact that it is limited to a thickness of one particle (or fraction thereof). Attempts to produce thicker coatings result either in unbonded particles at the outside which easily flake off or require such heat that the bottom layer of particles sink so far into the steel as to be lost as a coating. In either case, the end result is a coating of one particle thickness in which the only control is in the initial selection of particle size.

In the tube type hardfacing, a combination of binder metal and tungsten carbide granules are applied simultaneously to a locally preheated surface, sometimes following a preliminary sweat-on application before any appreciable cooling of the surface. A welding torch is applied both to heat the work area and to melt the tube of hardfacing. The tube consists of a hollow steel cylinder filled with a crushed tungsten carbide, sometimes with other materials, the ends of the tube being crimped or otherwise sealed to prevent the carbide filler from shaking out during storage and handling. The wall thickness and inside diameter of the tube are so related that the proportions of the two materials is known, preferred compositions being 60 weight percent (w/o) tungsten carbide to 40 w/o binder in applications with an oxy-acetylene torch and 70 w/o tungsten carbide, 30 w/o binder when using an atomic hydrogen torch. The difference lies in the higher temperature of the atomic hydrogen torch, which introduces more steel into the binder from the base metal being treated and causes greater tungsten carbide loss thereto.

The tube material is typically a low carbon steel, as such steels make quite satisfactory binders. Although such steels are relatively soft prior to use as a binder, they become quite abrasion resistant in the coating process. To a very minor extent, the tungsten carbide goes into solution with the binder, but this very minor amount causes a considerable increase in the hardness of the binder. As the short time during which heat is applied does not allow the attainment of equilibrium, the resulting composition is a complex of the three elements and their compounds, varying from one location to the next. Various other steels including alloy steels may be used as the binders in tube applications. When alloy steels are used, the alloying elements may either be incorporated in the carbon steel of the wall or, preferably, may be included as powders with the particulate filler of tungsten carbide or the like. One such material thus added is a combination of ferromanganese and ferromolybdenum, the quantities being such that the over-all composition of the binder is about 2 w/o Mn, about 0.5 w/o Mo, balance low carbon steel.

Tube hardfacings may be made considerably thicker than sweat-on hardfacings without loss of integrity, but nevertheless the critical limit is still in thickness. One thin layer may first be laid down, and successive layers superimposed thereon, but difficulties appear as the process is extended. The layer already applied is partially remelted and the relatively dense tungsten carbide particles tend to sink through the steel, leaving the outer layer depleted and relatively poor in wear resistance. Other undesirable qualities also appear in such thicker coatings, e.g., a greater frequency of gas holes and increasing brittleness. Experience indicates that tube hardfacings applied to cutting structures must be limited to a maximum thickness of about 1/16 inch to avoid such defects. Somewhat thicker coatings, up to about ⅛ inch, may be applied to such surfaces as rock bit gage surfaces and tool joint O.D. surfaces.

One general disadvantage of tube hardfacings is that they decrease the deep or major tooth impact breakage resistance below that of an unhardfaced steel tooth cutter. This becomes evident in drilling operations in certain formations and under certain drilling conditions, and has also been confirmed in laboratory tests. A cutter of the type shown in FIGURES 3 and 4, as an example, is securely mounted below an impact hammer so that the flat bottom end of the hammer will fall on the full flank of a single tooth. The free fall of the hammer is increased in successive tests until breakage occurs. Tests with the same hammer falling on an unhardfaced tooth and on the tube hardfaced flank of a tooth otherwise identical cause major tooth breakage (as opposed to minor tooth chipping) of the tube hardfaced tooth with a smaller free fall than obtains with the unhardfaced tooth.

There is apparently some relationship between such major tooth breakage resistance and the undesirable condition known as "notching" sometimes present in a tube hardfaced tooth. This condition is one in which a spot has been overheated by the welder during hardfacing to cause a relatively deep penetration of some of the binder and tungsten carbide. Neither of these hardfacing constituents is as resistant to fracturing as the tooth metal (typically AISI 4815 alloy steel, carburized and hardened), and the mixture appears to weaken the tooth. Notches may also originate from or near the surface of the hardfacing deposit, without notching of the tooth metal itself. The condition is rather difficult to detect, being invisible from the surface and also in section, except after polishing and etching. Inspection procedures involve either such sectioning of sample cones or some form of impact test, and are time consuming and costly.

The tungsten carbide particles mentioned above, and in the present invention as described below, are now well known in the art, and may be either the cast or sintered type. One preferred type of cast particles is produced by reacting powders of tungsten and carbon in a graphite crucible under high heat, and tapping the molten mixture into an oil bath. The quantities used, giving due regard to the carbon pickup from the crucible, are preferably such as to produce a eutectic of WC and $W_2C$ containing about 4 w/o combined carbon. The relatively large particles quenched in the oil bath are then crushed and screened. Crushing is desirable because it relieves the quenching stresses, as cleavage takes place along stress lines. Sintered tungsten carbide particles (sometimes called "cemented" because of the metal binder) are typically produced by cold pressing a WC powder with a minor amount of one or more metals selected from the Fe, Co, Ni family, and heating the resulting material in an inert atmosphere without pressure. The desired particle size may be obtained either from the original pressing or by crushing somewhat larger pellets.

Referring again to tube hardfacings, another disadvantage frequently seen therewith appears in cutter teeth hardfaced for a self-sharpening effect, i.e., on only one flank of each tooth. As the unhardfaced flank wears away, a sharp crest is maintained, but after a limited reduction in thickness the notch effect predominates and the tooth breaks off prematurely.

All of the disadvantages and defects mentioned are seen with tube applications either directly applied or with a preliminary sweat-on application, although the latter procedure helps minimize notching.

The principal object of the present invention is to provide hardfacing structures of greater thickness than prior art hardfacings, but without the defects inherent in the prior art structures.

Another object is to provide such a hardfacing structure on the cutting teeth of earth drilling tools.

Another object is to provide such hardfacing on cutting teeth and other structures subject to abrasion with a reduction in the aforementioned "notching" effect. A similar object is to furnish a hardfacing on cutting teeth which reduces the major tooth breakage thereof, i.e., relatively close to the root of the tooth.

A further object is to provide hardfacing on steel cutting teeth in which the teeth remain sharp during abrasive wear after such teeth with prior art hardfacing would be destroyed by major tooth breakage.

The above and other objects are generally achieved in the present invention by adding to a metal surface or to the prior art hardfacing as outlined above an additional layer of hardfacing in which the binder is of a lower melting point than the binder of the layers already applied. This binder is preferably applied with tungsten carbide particles to furnish increased wear resistance, but may also be applied alone, as a coating, to decrease major tooth breakage where additional wear resistance is not required. Any one of a number of metal alloys will serve well for such binder, the important characteristics being that it bonds well to the surface to which it is applied, be reasonably wear resistant, hold any tungsten carbide or other wear resistant particles firmly, and have the abovementioned melting point of lower value than that of the surface to which it is applied. The difference in melting points should be a minimum of about 100° F., and preferably 200 to 500° F. or more.

An illustration of a particular use of the hardfacing structures of the present invention is set forth in the attached drawing, but it is to be understood that such illustration together with the specific description thereof below, is not intended in a limiting sense. In the drawing—

Figure 2:
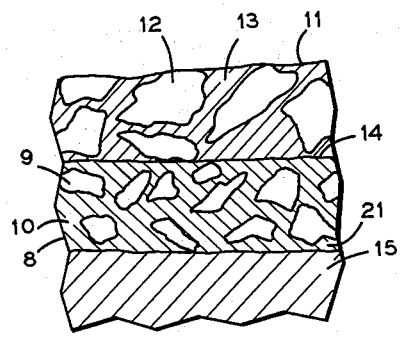
Figure 3:
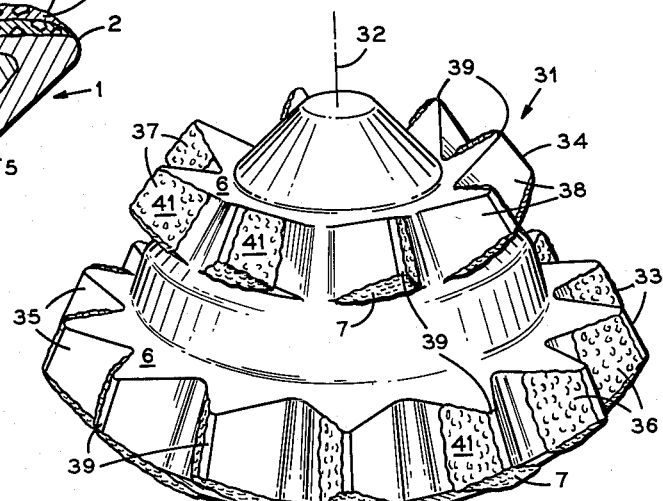
Figure 4:
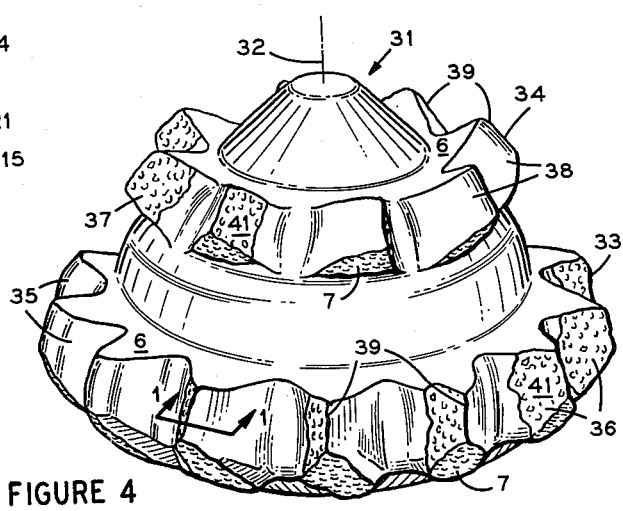

FIGURE 1 is an enlarged section through a tooth of a rock bit cone, as in lines 1—1 of FIG. 4, FIGURE 2 is a sketch prepared from a photomicrograph (at 75× magnification) of a portion of the section of FIG. 1, FIGURE 3 is a perspective view of a new rock bit cutter having certain teeth hardfaced as shown in FIGURES 1 and 2, and FIGURE 4 is a perspective view of the same cutter as in FIG. 3 after partial dulling through a considerable amount of use in drilling a wellbore.

FIGURE 1 shows in enlarged section a tooth indicated generally as 1 and having a crest 2, a root 3 and flanks 4 and 5. Inner end 6 and outer end 7 are indicated in FIGS. 3 and 4. FIGURE 1 also shows a layer of tube hardfacing 8 and superimposed thereon a hardfacing layer 11 according to the present invention. Tungsten carbide particles 9 of layer 8 are clearly distinguishable from the binder 10 thereof, as is also true of the tungsten carbide particles 12 and binder 13 of layer 11. Also discernible in FIGURE 1 is the boundary 14 between layers 8 and 11 and the carburized case 15 of tooth 1. The carburizing step may be performed either before or after hardfacing, preferably after. The average thicknesses of layers 8 and 11 are about ³⁄₆₄" and ¹⁄₃₂" respectively.

FIGURE 2 shows the structure of FIG. 1 in considerably greater detail. In this figure the presence of the sweat-on layer 21 may be detected by the lack of penetration of the tube hardfacing 8 into the steel of the tooth flank. Such layer 21 is virtually impossible to detect otherwise, as it blends imperceptibly into layer 8.

FIGURE 3 is an exterior view of the #3 cone 31 of a soft formation, 7⅞" (dia.) bit prior to any drilling. In operation, the bit is rotated so that cone 31 revolves clockwise about its axis 32 as viewed from the apex end of the cone. Thus each of the teeth contact the formation being drilled so that on heel row 33 and intermediate row 34 the respective flanks 35 and 37 are trailing while flanks 36 and 38 are leading. On the cone illustrated and on the other two cones of the same bit, each tooth of the heel row of teeth 33 is hardfaced on the leading flank 36 while each tooth of the intermediate row 34 is hardfaced on the trailing flank 37 (both flanks on spearpoint teeth of #1 cone, not shown). The choice of flank to be hardfaced is a matter of experience and varies from one formation to another and also varies with expected drilling conditions such as weight, rotary speed, type and rate of circulation of drilling fluid, etc. In some formations and under some conditions, the hardfacing to be used may be the reverse of that illustrated, while in other circumstances the hardfacing is better applied to both flanks, one flank and the crest, etc.

FIGURE 4 depicts the cutter of FIGURE 3 after extended field use. It should be noted that the crests 39 are still well defined and that the bulk of the hardfacing 41 is still in place despite the obvious wear of the cone. Although this cone and its two companion cones as described above and hardfaced as in the following example drilled through 2560 feet of sandstone and shale, its useful cutting life was far from completed when it was pulled for examination.

The following detailed example is furnished as illustrative of the manner of making and using the present invention, and the advantages thereof.

*Example*

A sweat-on hardfacing was applied to the teeth of a steel cutter on one flank and the outer end, following the prior art method discussed above. Immediately thereafter and before appreciable cooling of each tooth thus treated, the same tooth was covered with a tube hardfacing to a thickness of about ³⁄₆₄" on one flank. Each hardfacing was with cast tungsten carbide particles, the sweat-on coating being with particles screened to a size range of 14 to 20 mils while the particles in the tube hardfacing were in the range of 9 to 14 mils. The tube wall was of low carbon steel (0.15 w/o C. max.), and the carbide filling of the tube included sufficient ferromolybdenum and ferromanganese powders (screened through 80 mesh U.S. sieve) to make a binder of pre-application composition of about 2 w/o Mn, 0.5 w/o Mo, balance low carbon steel. The raw material ratio was 70 w/o tungsten carbide, 30 w/o binder, and an atomic hydrogen torch was used throughout. The melting point of this particular binder is about 2700° F.

A coating of sodium silicate was then painted on the hardfaced flanks of the cooled cone, cast tungsten carbide particles in the size range of 14 to 35 mils was applied to the silicate, and the cone allowed to dry. The flank being hardfaced was then heated uniformly with the atomic hydrogen torch to a temperature well above the melting point of the binder to be applied but below the melting point of the binder of the surface already formed, in this case to about 2400° F. as compared to a binder melting point of about 2700° F. in the tube hardfacing already applied and 2200° F. for the binder being applied.

A 1/8″ dia. binder rod was then brought up to the work and heated to melt onto the surface. The particular composition employed flowed very easily over the surface, so that it was unnecessary to move the rod as the flame of the torch was moved about the surface to insure uniform heating. It also has the further advantage of not flowing onto adjacent steel surfaces, making the use of dams and barrier coatings unnecessary. The composition of this high carbon alloy binder was in the following range:

| | |
|---|---|
| 3.8–4.2 w/o C | 0.08–0.13 w/o V |
| 1.75–2.05 w/o Si | 0.08–0.12 w/o |
| 1.85–2.15 w/o Ni | 0.04 w/o max. S |
| 0.75–1.05 w/o Mn | 0.04 w/o max. P |
| 0.18—0.22 w/o Mo | 0.30 w/o max. Cr. |
| 0.65–0.95 w/o Cu | Balance essentially Fe |

The teeth as thus hardfaced were impact tested in the manner previously set forth, together with identical teeth on identical cutters some with no hardfacing and others with only the prior art tube hardfacing. All three types of cutters were first simultaneously heat treated and carburized in the same batch to eliminate any differences from such conditions. Average results for a number of specimens tested to failure with a freely falling two pound hammer were 106.8 inches to break an unhardfaced tooth, 38.4 average inches for a tooth hardfaced by the prior art technique, and 67.2 inches for the tooth hardfaced per the present invention.

As already mentioned, a typical field performance of cutters thus hardfaced in a 7 7/8″ bit is 2560 feet of sandstone and shale with only an estimated 50% of complete dulling. The average performance of prior art hardfaced bits of the same design and size in drilling the same type of formation to the end of their useful cutting lives is 2480 feet.

Other binder alloys suitable as replacements for the above high carbon alloy (or alloy cast iron) include the following:

High carbon steel:
    0.7—1.0 w/o C
    0.4–0.6 w/o Mn
    0.2–0.35 w/o Si
    3.25–3.75 w/o Ni
    0.2–0.3 w/o Mo
    0.04 w/o max. S
    0.04 w/o max. P
    Balance essentially Fe
Non-ferrous alloy:
    1.0–1.5 w/o C
    27–33 w/o Ni
    35–45 w/o W
    Balance essentially Co, may contain minor amounts of Fe, Mn, Si, etc.

Hardfacings of the above compositions have been applied and tested in the laboratory with results comparable to those obtained with the more completely tested alloy cast iron.

It will be apparent that there is some superficial similarity between the hardfacing technique of the present invention and the sweat-on method of the prior art. The only real similarity is that both start by adhering the tungsten carbide particles to the surface with a sodium silicate flux. Here the similarity ends, because in the present invention there is no melting or at the most only very shallow superficial melting of the surface being hardfaced, but on the contrary the binder used is introduced externally and is carefully selected so that there need be little or no melting of the surface. Thus there is no sinking of the abrasive, wear-resistant particles into the surface being coated, and the layer is consequently considerably thicker than a sweat-on hardfacing.

The method described does entail a limitation to a thickness of one particle plus a small thickness of binder above and below the particles, but even this limitation may be overcome to some extent by the use of a tube technique. The tube technique is not considered eminently practicable for high carbon steel because of the high cost of forming tubes of such materials, but if this factor is ignored the tube method may be used readily enough. Weld rods containing tungsten carbide particles dispersed throughout the binder may be used and an initially flexible tube may be carburized before filling with tungsten carbide to lower the binder melting point. The factors limiting tube hardfacings as above discussed would then limit the thickness of the present hardfacings of low melting point. However, the general technique of the present invention may be extrapolated by applying successive hardfacings each of which includes a binder of lower melting point than that of the layer to which it is applied.

The present invention broadly comprises hardfacing binders of lower melting points than prior art binders, with or without inclusions of wear resistant particles such as tungsten carbide. Such binders and combinations thereof with wear resistant particles may be applied directly to metal surfaces, to prior deposited sweat-on hardfacing or tube hardfacing, and has been shown to be of particular utility as a third hardfacing layer following both sweat-on and tube coatings. Such binders may vary considerably in composition so long as they are of lower melting point than the surface to which they are applied, bond well to such surface and to any included hard particles, and are reasonably wear resistant and sufficiently tough to resist spalling and other breakage (not brittle). Representative compositions have been shown to resist major tooth breakage better than prior art binders and to provide increased wear resistance.

While the prior art tube hardfacings have been described above as deposited from various steel tubes containing coarsely ground particulate tungsten carbide, it is apparent that the hardfacing deposit thus formed is not limited by the means of applying it. Thus the tungsten carbide particles could be brushed on with a sodium silicate adhesive-flux, followed by welding with a binder rod of appropriate composition (which can be the same as that of the steel in the teeth or other structure being hardfaced), could be appplied from a rod containing tungsten carbide particles dispersed in the binder, etc. As used in the appended claims, the words "tube hardfacing" are intended to have this more general connotation.

What is claimed is:

1. An improved, metal, earth-penetrating tool having surfaces subject to severe or constant abrasion, frequently accompanied by heavy impacts, and having an inner layer of hardfacing bonded to portions of such surfaces, such hardfacing comprising a metallic binder and wear resistant particles dispersed throughout such binder, the improvement comprising at least one outer layer of hardfacing similarly comprising wear resistant particles dispersed in a metallic binder bonded to said inner hardfacing layer, the binder of said outer layer being a metal selected from the class consisting of alloy cast iron, high carbon alloy steel, alloys of nickel and alloys of cobalt, characterized by reasonable wear resistance, toughness, and a melting point lower than that of the next inner layer by at least 100° F. and preferably by 200° to 500° F. or more, said inner layer having a binder metal selected from the class consisting of alloys of iron, alloys of nickel and alloys of cobalt, whereby the hardfacing on such tool is of increased wear resistance and toughness.

2. The improvement of claim 1 in which said outer binder alloy is an alloy cast iron.

3. The improvement of claim 1 in which said outer binder alloy is a high carbon steel alloy.

4. An improved, metal, earth-penetrating tool having surfaces subject to severe or constant abrasion, frequently accompanied by repeated heavy impacts, and having an inner layer of hardfacing bonded to portions of such surfaces, such hardfacing comprising a metallic binder and wear resistant particles dispersed throughout such binder, the improvement comprising at least one outer layer of hardfacing similarly comprising wear resistant particles dispersed in a metallic binder bonded to the next inner hardfacing layer, the binder of said outer layer being a metal alloy characterized by reasonable wear resistance, toughness and a melting point lower than that of the inner layer by at least 100° F. and preferably 200 to 500° F. or more, said outer binder alloy consisting essentially of from 3.8 to 4.2 weight percent carbon, about 2 weight percent each of silicon and nickel, about 1 weight percent each of silicon and nickel, about 1 weight percent each of manganese and copper, about 0.2 weight percent molybdenum, and about 0.1 weight percent each of vanadium and boron, balance essentially iron.

5. An improved, metal, earth-penetrating tool having surfaces subject to severe or constant abrasion, frequently accompanied by repeated heavy impacts, and having an inner layer of hardfacing bonded to portions of such surfaces, such hardfacing comprising a metallic binder and wear resistant particles dispersed throughout such binder, the improvement comprising at least one outer layer of hardfacing similarly comprising wear resistant particles dispersed in a metallic binder bonded to the inner hardfacing layer, the binder of said outer layer being a metal alloy characterized by reasonable wear resistance, toughness and a melting point lower than that of the next inner layer by at least 100° F. and preferably 200 to 500° F. or more, said outer binder alloy consisting essentially of from 0.7 to 1.0 weight percent carbon, 0.4 to 0.6 weight percent manganese, about 0.25 weight percent each of silicon and molybdenum and 3.25 to 3.75 weight percent nickel, balance essentially iron.

6. An improved, metal, earth-penetrating tool having surfaces subject to severe or constant abrasion, frequently accompanied by repeated heavy impacts, and having an inner layer of hardfacing bonded to portions of such surfaces, such hardfacing comprising a metallic binder and wear resistant particles dispersed throughout such binder, the improvement comprising at least one outer layer of hardfacing similarly comprising wear resistant particles dispersed in a metallic binder bonded to the inner hardfacing layer, the binder of said outer layer being a metal alloy characterized by reasonable wear resistance, toughness and a melting point lower than that of the next inner layer by at least 100° F. and preferably 200 to 500° F. or more, said outer binder alloy consisting essentially of about 1.25 weight percent carbon, about 30 weight percent nickel, about 40 weight percent tungsten, balance essentially cobalt.

References Cited by the Examiner
UNITED STATES PATENTS

| | | | |
|---|---|---|---|
| Re. 21,520 | 7/1940 | Schwarzkopf | 29—182.7 |
| 1,901,654 | 3/1933 | Kerr | 219—77 XR |
| 1,903,077 | 3/1933 | Wolf | 219—77 XR |
| 1,960,879 | 5/1934 | Russell. | |
| 1,977,128 | 10/1934 | Hawkins | 29—191.2 XR |
| 2,033,513 | 3/1936 | Comstock | 75—203 X |
| 2,048,276 | 7/1936 | Marlies | 29—195 |
| 2,171,391 | 8/1939 | Boecker | 75—201 |
| 2,173,484 | 9/1939 | Lerch | 117—105.2 XR |
| 2,423,490 | 7/1947 | Erhardt | 117—105 |
| 2,592,414 | 4/1952 | Gibson. | |
| 2,709,213 | 5/1955 | Gibson | 219—76 |
| 2,733,172 | 1/1956 | Brennan | 117—105 |
| 2,841,687 | 7/1958 | Richter | 219—76 |
| 2,964,420 | 12/1960 | Poorman | 117—105.2 XR |
| 3,023,490 | 3/1962 | Dawson | 29—195 |
| 3,063,310 | 11/1962 | Connoy | 219—77 XR |
| 3,066,402 | 12/1962 | Ingels | 29—195 XR |
| 3,069,760 | 12/1962 | Schultz | 29—195 |
| 3,089,945 | 5/1963 | Connoy | 76—112 XR |
| 3,097,959 | 7/1963 | Zachman | 117—22 |
| 3,101,274 | 8/1963 | Beyerstedt | 117—22 XR |
| 3,109,917 | 11/1963 | Scmidt | 219—76 |

HYLAND BIZOT, *Primary Examiner.*

RICHARD D. NEVIUS, DAVID L. RECK, *Examiners.*

R. E. ZIMMERMAN, *Assistant Examiner.*